United States Patent
Howarth et al.

(10) Patent No.: US 7,302,476 B1
(45) Date of Patent: Nov. 27, 2007

(54) METHOD AND APPARATUS FOR CONFIGURING A DEVICE THAT IS NON-CONFORMING WITH A MANAGEMENT SYSTEM USING CONFIGURATIONS PROVIDED BY THE MANAGEMENT SYSTEM OVER A NETWORK

(75) Inventors: Arthur Howarth, San Jose, CA (US); Bruce Moon, Dublin, CA (US); Pamela Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 630 days.

(21) Appl. No.: 10/283,944

(22) Filed: Oct. 29, 2002

(51) Int. Cl.
*G06F 15/177* (2006.01)

(52) U.S. Cl. .................................................. 709/220

(58) Field of Classification Search ........ 709/220–222, 709/230
See application file for complete search history.

(56) References Cited

U.S. PATENT DOCUMENTS

| 5,949,779 | A * | 9/1999 | Mostafa et al. | 370/389 |
| 5,991,828 | A * | 11/1999 | Horie et al. | 709/220 |
| 6,721,872 | B1 * | 4/2004 | Dunlop et al. | 712/28 |
| 6,912,567 | B1 * | 6/2005 | Allard et al. | 709/223 |
| 6,959,329 | B2 * | 10/2005 | Thakor | 709/220 |
| 6,973,488 | B1 * | 12/2005 | Yavatkar et al. | 709/223 |
| 6,988,143 | B2 * | 1/2006 | O'Neill et al. | 709/230 |
| 2001/0034771 | A1 * | 10/2001 | Hutsch et al. | 709/217 |
| 2002/0112076 | A1 * | 8/2002 | Rueda et al. | 709/245 |
| 2002/0129132 | A1 * | 9/2002 | Sato | 709/223 |
| 2003/0074430 | A1 * | 4/2003 | Gieseke et al. | 709/221 |
| 2003/0101240 | A1 * | 5/2003 | Courtney | 709/220 |
| 2003/0191771 | A1 * | 10/2003 | Arrouye et al. | 707/101 |
| 2003/0191826 | A1 * | 10/2003 | Bellinger et al. | 709/220 |
| 2003/0217126 | A1 * | 11/2003 | Polcha et al. | 709/220 |
| 2005/0193080 | A1 * | 9/2005 | Gold et al. | 709/208 |

OTHER PUBLICATIONS

Sollins, K., "RFC 1350—The TFTP Protocol (Revision 2)", Jul. 1992.*

* cited by examiner

*Primary Examiner*—David Wiley
*Assistant Examiner*—J. Bret Dennison
(74) *Attorney, Agent, or Firm*—Hickman Palermo Truong & Becker LLP

(57) ABSTRACT

A method is disclosed for configuring a device that is non-conforming with a management system using configurations provided by the management system over a network. A network event generated from the device is detected. In response to the network event, the set of configurations from the management system are retrieved for the device. The set of configurations are converted into a form that is suitable for the device. The device is enabled to use the set of configurations to communicate over the network.

43 Claims, 5 Drawing Sheets

METHOD AND APPARATUS FOR CONFIGURING A DEVICE THAT IS NON-CONFORMING WITH A MANAGEMENT SYSTEM USING CONFIGURATIONS PROVIDED BY THE MANAGEMENT SYSTEM OVER A NETWORK

FIELD OF THE INVENTION

The present invention generally relates to management of network devices. The invention relates more specifically to a method and apparatus for configuring a device that is non-conforming with a management system using configurations provided by the management system over a network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Management systems for networks exist to provide a common infrastructure and connective environment for network devices. But network enabled devices are often manufactured by many vendors, using different platforms, or varying footprints. As a result, a management system on a network may not be able to adequately communicate with some devices, so that centralized management of such devices is hindered or impossible.

Management systems employed on networks may utilize devices such as Cisco Networking Services servers, provided by Cisco Systems Inc., to manage other components on a network. But such management systems may not always be able to be effective in communicating with and managing each device on the network, especially when a connected device uses a different platform or proprietary technology for use in network communications. As networks become more complex, the number of devices that are not compatible with the network's management system may increase. As a result, the management system may become less effective as new devices are added to a network.

Even if devices are made to conform with one another and with a management system using ad-hoc network implementations, the resulting collection of individual devices may become confusing or overwhelming to the service provider that supports the devices.

Certain types of physically connected devices can be configured and managed on a network through a connection with another device that is capable of communicating with the management system. For example, an interface card for a host device may be inserted into a slot of the device. The insertion of the card triggers an Online Insertion and Removal (OIR) event, which causes the host device to retrieve a configuration for the inserted device from the network's management system. The host device provides the configuration for the inserted device after retrieving the configuration. For example, the host device may actually load the configuration into the device using the physical connection, so that the connected device can be managed by the network's management system.

Based on the foregoing, there is a clear need to enable a network device to be configured and managed by the network's management system when the management system and the network device lack capability to adequately communicate with one another.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
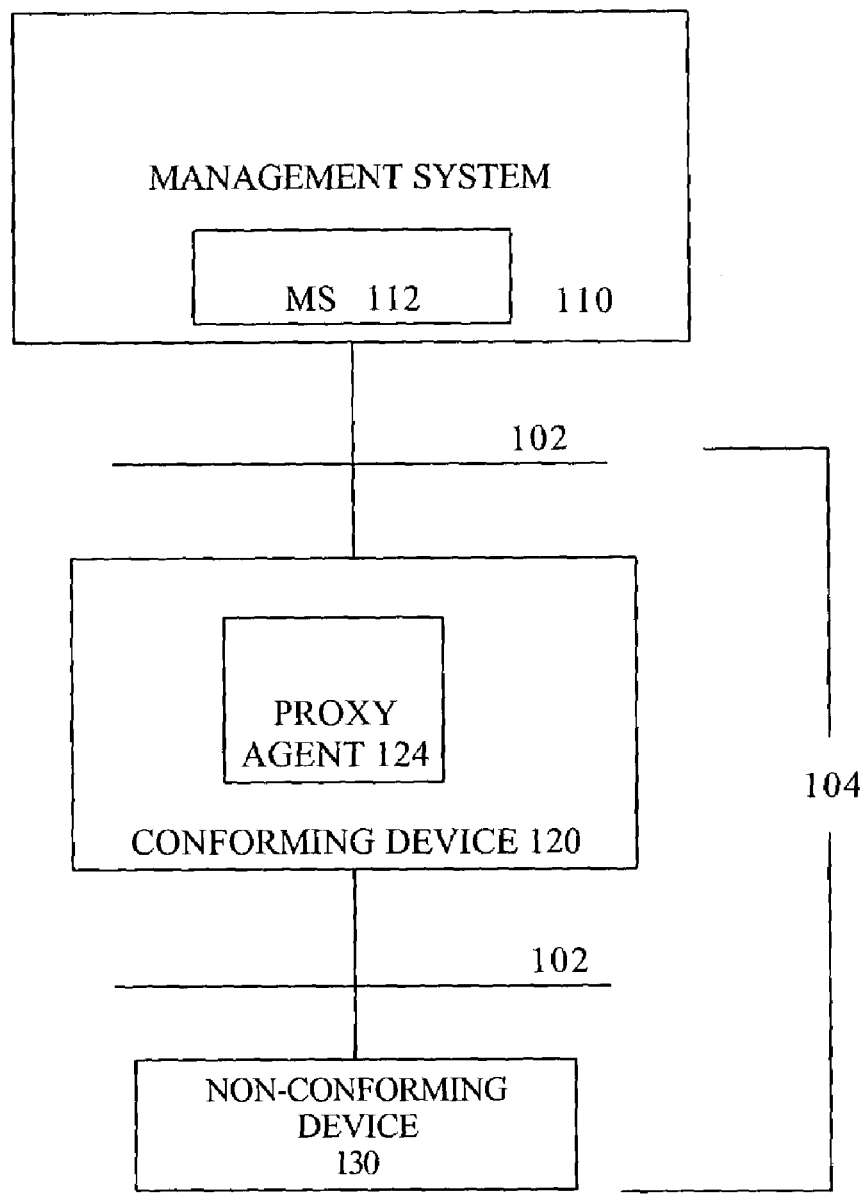
FIG. 1 illustrates a system in which a management system can configure a device that is otherwise configured not to conform with the management system.

A method and apparatus are described for configuring a device that is non-conforming with a management system using configurations provided by the management system over a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 System Overview
   3.0 Functional Description
   4.0 Using A Proxy Agent With A DHCP Server
   5.0 Implementation Mechanisms—Hardware Overview
   6.0 Extensions and Alternatives 1.0 General Overview The needs identified in the foregoing Background, and other needs and objects that will become apparent for the following description, are achieved in the present invention, which comprises, in one aspect, a method for using a management system to configure a device that is non-conforming with the management system for communications on a network. In one embodiment, a network event generated from the device is detected. In response to the network event, a configuration is retrieved from the management system for the device. The configurations are converted into a form suitable for the device. Once converted, the configurations are sent to the device in order to enable the device to configure itself for network communications.

Embodiments described herein provide for configuring a device that is non-conforming with a management system using configurations provided by the management system over a network. A network event generated from the device is detected. In response to the network event, the set of configurations from the management system is retrieved for the device. The set of configurations is converted into a form that is suitable for the non-conforming device. The non-conforming device is enabled to use the set of configurations to communicate over the network. Moreover, the management system may effectively manage the non-conforming device once it is configured.

In another embodiment, a Dynamic Host Configuration Protocol (DHCP) (sometimes alternatively referred to as "Dynamic Host Control Protocol") network broadcast is detected from the device. A response from a DHCP server to the network broadcast is delayed. The set of configurations from the management system is retrieved. The device uses the set of configurations to communicate over the network using the response from the DHCP server.

As used herein, the term "configurations" means data, instructions, rules, code and/or logic that can be utilized to modify or establish operations of a device. A "set of configurations" refers to one or more configurations.

In other aspects, the invention encompasses a computer apparatus and a computer-readable medium configured to carry out the foregoing steps.

2.0 System Overview

FIG. 1 illustrates a system in which a management system can configure a device that is otherwise configured to not conform with the management system. According to FIG. 1, a system 100 includes a management system 110 that provides configuration data and/or instructions ("configurations") to a plurality of devices 104 on a network 102. Management system 110 is able to communicate with and manage conforming device 120 over a network 102. The conforming device 120 is able to communicate with and receive configurations from management system 110 without use external logic or functionality. The non-conforming device 130 requires external logic or functionality in order to receive configurations from the management system 110. Thus, unless provisions are made for non-conforming device 130, the management system 110 effectively manages the conforming device 120 and not non-conforming device 130.

The configurations provided by management system 110 may be used to manage and control devices connected to network 102. The conforming device 120 may communicate with management system 110 over network 102 to receive management instructions. In an embodiment, conforming device 120 is indirectly communicatively coupled with the non-conforming device 130. For example, non-conforming device 130 may connect to network 102, and communicate with conforming device 120 over that network. Alternatively, non-conforming device 130 may communicate to the conforming device 120 through another network, or through a serial bus or other connection.

In one embodiment, network 102 is a local area network (LAN), such as an Ethernet network. Alternatively, another embodiment may provide that management system 110 is accessible over a wide-area network or internetwork such as the Internet, while conforming device 120 and non-conforming device 130 communicate over a LAN.

In one embodiment, the management system 110 includes a management server 112 that communicates with other components of the management system through one or more network busses, or through network 102. The management server 112 may correspond to a machine that configures other devices using a particular form. For example, management server 112 may configure conforming devices accessible through network 102 using Extensible Markup Language (XML). Example types of devices that correspond to the management server 112 include a CNS Event Gateway and/or a CNS Configuration Server, as manufactured by Cisco Systems,™ Inc. of San Jose, Calif. One example commercially available management server 112 is the Cisco Intelligence Engine 2100™.

The conforming device 120 may communicate with management server 112 to receive its configurations, as well as configurations for non-conforming device 130. In one embodiment, conforming device 120 includes a proxy agent 124 that communicates with both management server 112 and non-conforming device 130 over network 102. The proxy agent 124 is used to provide the configurations to non-conforming device 130.

The non-conforming device 130 may include client components that enable the device to receive certain initial configurations through widely used non-platform specific servers. In one embodiment, non-conforming device 130 is configured to receive configurations from a Dynamic Host Configuration Protocol (DHCP) server and/or a Trivial File Transfer Protocol (TFTP) server. But absent logic that is external to non-conforming device 130, the non-conforming device is unable to be configured or managed by the management server 112. While embodiments such as described above and elsewhere in this application describe use of devices that operate DHCP and TFTP protocols, it should be noted that the use of DHCP and TFTP devices in this application serve as one example for an embodiment. The specific protocols that may be relied upon may be determined on a case-by-case basis depending on the particular non-conforming device.

In typical applications, non-conforming device 130 requires configurations during an initialization process that allows the device to communicate with other devices over network 102. In one embodiment, when non-conforming device 130 is first connected to network 102, the non-conforming device makes a network broadcast to request configurations from a server. For example, the non-conforming device may make a DHCP broadcast to receive configurations from a DHCP server. The configurations from the DHCP server allow the non-conforming device to receive additional configurations from other devices, as well to communicate over the network 102.

Subsequent to the initialization process, the non-conforming 130 may still continue to seek a DHCP server, or another server, to receive and update configurations. As will be described, the proxy agent 124 will utilize the DHCP client of the non-conforming device 130, and/or other abilities of the non-conforming device to receive configurations, to enable the management system 110 to provide additional or alternative configurations for the non-conforming device. The configurations enable the management system 110 to manage the non-conforming device 130, for such purposes as incorporating the non-conforming device into firewall policies, managing the connections on the network 102, and maintaining a consistent logical appearance of the devices on the network to applications that manage those devices.

In response to the broadcast made by the non-conforming device 130, proxy agent 124 may identify non-conforming device 130 to the management server 112 so that the management server is able to select configurations that are appropriate for the non-conforming device 130. The management server 112 may access the configurations from a library, external memory or other server through a bus connection, through network 102, or through some other network. In one embodiment, the selection of the configurations for non-conforming device 130 are made based on the type, platform or vendor of the device.

In an embodiment, the configurations selected by management system 110 are provided to proxy agent 124. The proxy agent 124 converts the configurations from a form of the management system 110 to a form suitable for the non-conforming device 130. For example, the proxy agent 124 may convert the configurations from XML to a binary form that is suitable for the non-conforming device 130. As another example, the configurations may be converted into another form, such as ASCII (acronym for American Standard Code for Information Interchange). The converted configurations may either be stored for subsequent access by the non-conforming device 130, or alternatively, sent to the non-conforming device. The logic to convert the configurations into the form of the non-conforming device 130 may be provided by management system 110. This allows conforming device 120 to be flexible and robust so it can service more than one non-conforming device at one time. However, logic for converting the configurations provided by management system 110 alternatively may be existing or pre-loaded on the conforming device 120.

In one application, management server 112 corresponds to a Cisco Network Services (CNS) server that is able to configure CNS enabled devices that are connected to network 102. The conforming device 120 corresponds to a CNS enabled home gateway. Both the management server 112 and the conforming device 120 may communicate using XML. The non-conforming device 130 may correspond to, for example, a voice-over IP device, such as an ATA-186P. The non-conforming device 130 may not have sufficient resources or intelligence to communicate in XML with other devices over network 102. The form required for communications with the non-conforming device may be binary, for example, so that conversion from XML to binary is necessary in order for the non-conforming device to access and use configurations from management system 110. Alternatively, the form required by the non-conforming device may be, for example, ASCII, in which case the conversion would have to be from XML to ASCII. The configurations from management system 110 enable the management system to more affectively manage the non-conforming device 130 along with other devices on network 102.

3.0 Functional Description

Figure 2:
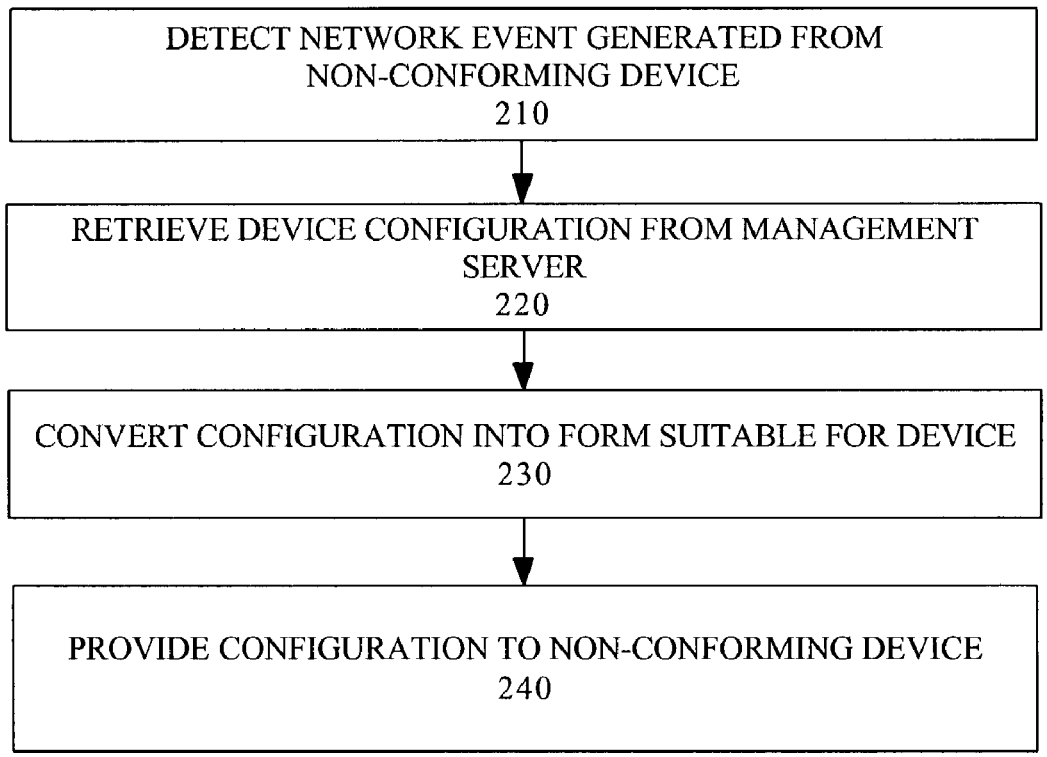
FIG. 2 illustrates a basic method for configuring a device that is non-conforming with a management system, so that the non-conforming device receives at least some of its configurations from the management system.

FIG. 2 illustrates a basic method for configuring a device that is non-conforming with a management system so that the non-conforming device receives at least some of its configurations from the management system. For purpose of illustration, the method of FIG. 2 is described with reference to elements of FIG. 1; however the method of FIG. 2 is not limited to the embodiment of FIG. 1.

Step 210 provides that a network event generated from or associated with the non-conforming device 130 is detected. In an embodiment such as shown by FIG. 1, the proxy agent 124 detects the network event. The network event may correspond to a broadcast request made from the non-conforming device 130 for configurations that can be used by the non-conforming device for subsequent use on the network 102. The broadcast may be heard by multiple components, including by conforming device 120 having proxy agent 124. As an example, the network event is a DHCP broadcast sent from the non-conforming device 130 and detected by proxy agent 124.

In response to detecting the network event, step 220 provides that configurations for the device are retrieved from management system 110. The proxy agent 124 may identify non-conforming device 130 to the management system 110 so that the management system is able to select the appropriate configurations for the non-conforming device 130. For example, the proxy agent 124 may identify the type and manufacturer of the device. In response to proxy agent 124 making the identification, management system 110 accesses a library, or an external resource, in order to select configurations for the non-conforming device.

In step 230, the configurations retrieved from the management system 110 are converted into a form suitable for the non-conforming device 130. In one embodiment, proxy agent 124 converts the configurations from a form provided by the management system 110 to a form suitable for the non-conforming device 130. For example, the proxy agent 124 converts the configurations from XML to a binary form.

In step 240, the configurations that are provided by management system 110 are provided, or made available to, the non-conforming device 130. In one embodiment, a file is created on the conforming device 120 that stores the configurations for the non-conforming device 130. This file can subsequently be accessed by the non-conforming device 130. Alternatively, the configurations may be directly loaded onto the non-conforming device 130 from conforming device 120. Once the configurations are loaded, non-conforming device 130 is able to configure itself for network communications. In particular, non-conforming device 130 is able to configure itself for network communications under the management and/or control of the management system 110, based on the configurations provided to it by the management system.

Thus, in a situation where a non-conforming device is connected to a conforming device over a network, embodiments enable the conforming device to access its management system to configure the non-conforming device. The result is that the non-conforming device can be managed in substantially the same way as the conforming device.

4.0 Using a Proxy Agent with a DHCP server

Figure 3:
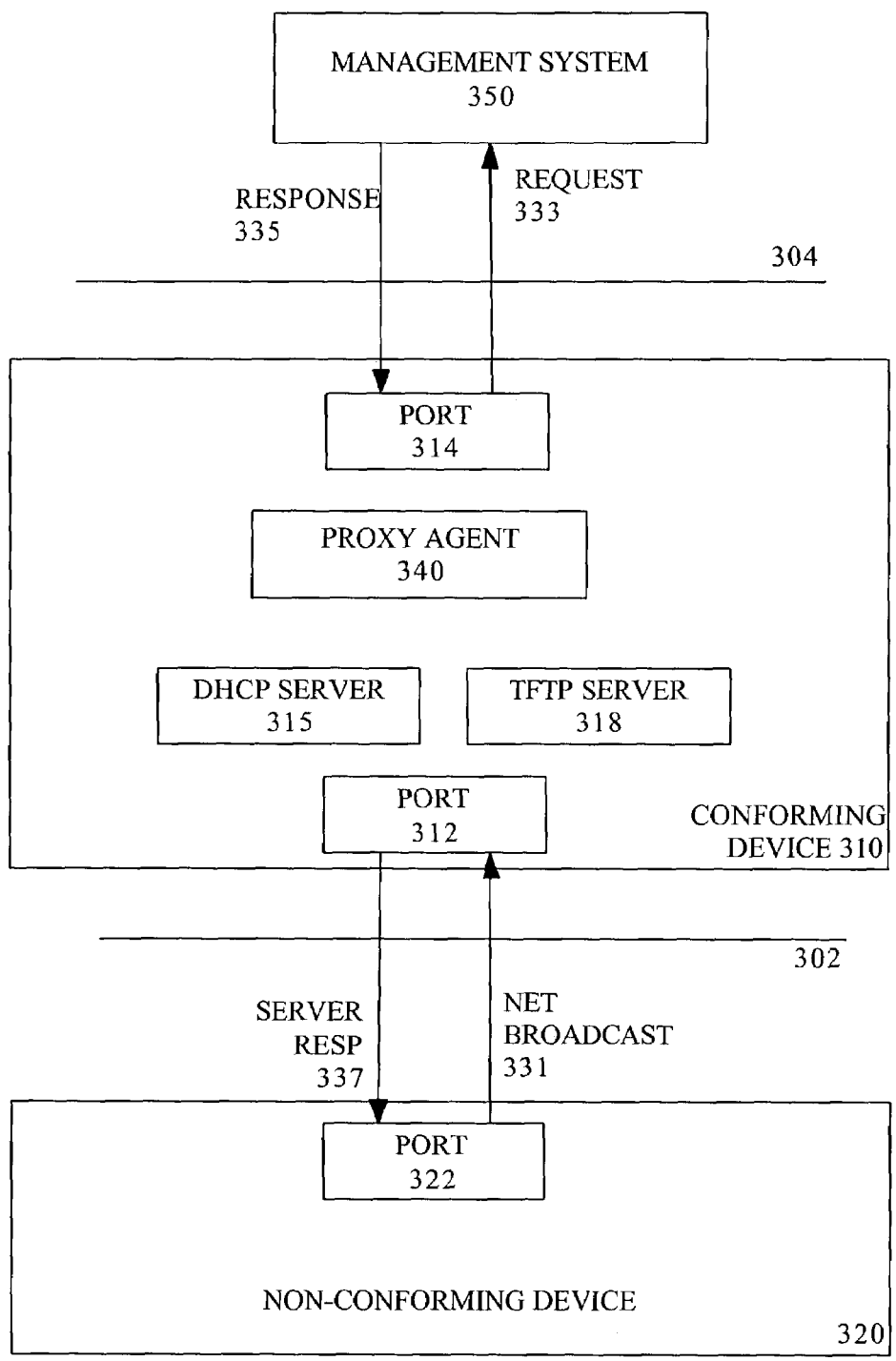
FIG. 3 is a basic block diagram of a conforming device that provides configurations to a non-conforming device.

FIG. 3 is a basic block diagram illustrating a conforming device that provides configurations to a non-conforming device. As shown, a conforming device 310 may provide configurations to a non-conforming device 320. A management system 350 may manage conforming device 310 without external logic. On the other hand, the non-conforming device 320 cannot be managed directly by the management system 350.

In FIG. 3, conforming device 310 includes a first network port 312 to connect to a network port 322 of non-conforming device 320 across a network 302. The conforming device 310 may also include a second network port 314 to enable the conforming device 310 to communicate with the management system 350 across a second network 304. As an example, the first network 302 may be a LAN using a protocol such as Ethernet, and each of the first network port 312 of the conforming device 310 and the network port 322 of the non-conforming device corresponds to an Ethernet enabled port. The second network 304 may correspond to an internetwork such as the Internet. Alternatively, first network 302 and second network 304 may be the same network.

In an embodiment, conforming device 310 includes a proxy agent 340, a DHCP server 315, and a TFTP server 318. The proxy agent 340 may use DHCP server 315 and/or TFTP server 318 to configure non-conforming device 320 with configurations from management system 350. When not in use to configure non-conforming device 320, the DHCP server 315 and the TFTP server 318 server may provide some configurations to devices that carry a client application for each of the respective server components.

In one embodiment, non-conforming device 320 sends out a network broadcast 331 intended for DHCP server 315. The network broadcast 331 may be part of an initialization procedure, where, for example, an out-of-the-box device is connected to the network for the first time. During such initialization processes, many devices typically send out a network broadcast, often intended for a DHCP server or other widely used configuration component, in order to receive configurations to operate on the network. Thus, when non-conforming device 320 is connected to network 302 it may automatically send out network broadcast 331 as part of an initialization process so that it can receive configurations for operating on network 302.

For example, DHCP server 315 may, in response to the network broadcast 331, provide an IP address for the non-conforming device 320, an identification for the non-conforming device, and one or more addresses to other components to enable the non-conforming device to receive other initial configuration data. The DHCP server 315 may perform these functions independently of its use with proxy agent 340. As another example, some of the configurations provided by DHCP server component 315 may include the address of TFTP server 318 where additional configuration information may be made available to the non-conforming device 320. Such information may include, for example, a phone number for instances when the non-conforming device 320 is a voice-over-IP device.

According to an embodiment, the proxy agent 340 may provide configurations for non-conforming device 320 from management system 350 that include, for example, encryption keys, firewall configurations, phone numbers, and addresses to many different servers that can function with the non-conforming device 320. The configurations from the management system 350 may cause the non-conforming device 320 to have a consistent appearance to the management server. The communications and network paths between the non-conforming device 320 and the management system 350 may also be controlled through use of configurations provided by the management system. As a result, the non-conforming device 320 may be configured and subsequently managed by the management system 350, even though the non-conforming device is not suited for communicating with the management system directly. The management system 350 is then able to treat components in its domain in a substantially uniform manner.

In one embodiment, the proxy agent 340 may be triggered in response to the network broadcast 331. As mentioned, the network broadcast 331 may be part of the initialization procedure by which non-conforming device 320 seeks to operate on network 302. In response to the network broadcast 331, proxy agent 340 causes conforming device 310 to send a request 333 to the management system 350 for configurations that are to be provided to the non-conforming device 320. In the request 333, proxy agent 340 identifies the non-conforming device 320 to the management system 350, so that the management system can select the configurations that are best suited for the non-conforming device. The configurations may be selected from various resources, such as through a library, other computers or memory resources connected to the management system 350 through a bus network, or over another network.

A response 335 from management system 350 includes the configurations for the particular non-conforming device 320. The configurations may be provided in a form that is not suitable for the non-conforming device 320. The proxy agent 340 (or other component on the conforming device) may convert the configurations into a form that is suitable for the non-conforming device 320. Once converted, the configurations are provided to the non-conforming device 320 through a server response from conforming device 310. In one embodiment, a server response 337 is provided to the non-conforming device 320 through the DHCP server 315, and the configurations are provided to the non-conforming device through the use of TFTP server 318. The server response 337 from DHCP server 315 may identify an address for the TFTP server 318, where a file contains the configurations from the management system 350. The non-conforming device 320 subsequently may access the TFTP server 318 to locate the file containing the converted configurations provided from the management system 350.

While an embodiment such as described with FIG. 3 illustrates use of proxy agent 340 operating with a single device, other embodiments may employ the proxy agent with multiple devices. Multiple non-conforming devices may easily be grouped into a collection of interfaces on the conforming device 310, where the proxy agent 340 resides.

Figure 4:
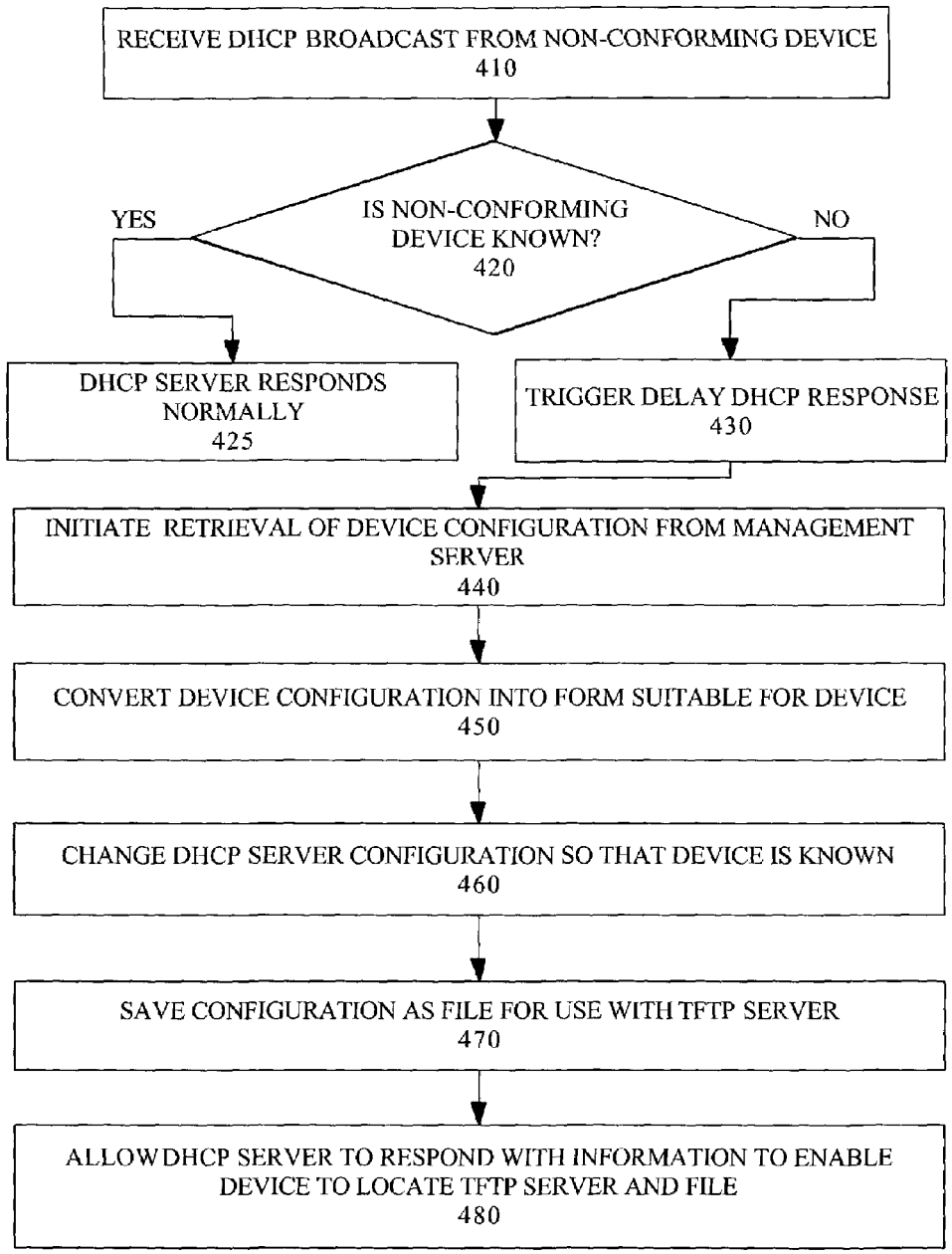
FIG. 4 illustrates a method for using a proxy agent to configure a non-conforming device in conjunction with operations of a Dynamic Host Configuration Protocol server and a Trivial File Transfer Protocol server.

FIG. 4 illustrates a method for using a proxy agent to configure a non-conforming device in conjunction with operations of a DHCP server and a TFTP server. For purpose of illustration, a method such as described with FIG. 4 is described with reference to elements of FIG. 3.

In step 410, a DHCP broadcast is detected from non-conforming device 320. The DHCP broadcast may be sent from a DHCP client on non-conforming device 320 in an attempt to locate the DHCP server 315 on first network 302.

In response to detecting the network broadcast, step 420 provides that a determination is made as to whether the non-conforming device 320 is known to the DHCP server 315. A known device is assumed to have been configured by management system 350, and step 425 provides that DHCP server 315 responds normally if the non-conforming device 320 is known. The normal response may be to update configuration data that the DHCP server 315 previously provided, without accessing the management system 350.

If the determination in step 420 is that the non-conforming device 320 is unknown, then step 430 provides a trigger to delay a response from the DHCP server 315. In an embodiment, a trigger mechanism may be incorporated into the DHCP server 315 so that proxy agent 340 is activated when an unknown non-conforming device 320 sends the network broadcast. When the trigger mechanism is triggered, the proxy agent 340 (or other mechanism) may cause the delay by the DHCP server 315. Depending on factors such as the speed of the network connection and the quality of the components being used, the delay may have a duration ranging between micro-seconds to seconds.

Step 440 provides that retrieval of configuration device is initiated in response to triggering the trigger mechanism. The proxy agent 340 may, for example, initiate a process by which the non-conforming device 320 is identified to the management system 350, and the configurations for that device are retrieved from the management system.

In step 450, the configurations are converted into a form suited for the non-conforming device 320. In one embodiment, conversion logic is retrieved from management system 350. Such an embodiment provides the conforming device 310 and/or proxy agent 340 with flexibility to handle multiple types of non-conforming devices. In one embodiment, at least some of the logic for performing step 450 is retrieved from the management system 350 along with the configurations for the non-conforming device 320. In another embodiment, the logic for converting the configurations for use by non-conforming device 320 may be incorporated into the proxy agent 340, or preloaded onto the conforming device 310.

Step 460 provides that a configuration of DHCP server 315 is changed to reflect that the non-conforming device 320 making the broadcast detected in step 410 has become known.

In step 470, the configurations retrieved from the management system 350 are saved as a file associated with the TFTP server 318. The configurations are saved in their converted form to facilitate subsequent use. However, step 470 is not required.

In step 480, the DHCP server 315 is allowed to respond to the broadcast detected in step 410. The response from the DHCP server 315 includes information to enable the non-conforming device 320 to locate the TFTP server 318. Either the response, or the TFTP server 318, may enable non-conforming device 320 to locate the file with the converted configurations.

The configurations may then be used by the non-conforming device 320. The resulting configuration of the non-conforming device enables the device to be managed and controlled by the management system 350. In one embodiment, the configurations retrieved from management system 350 are stored in a file served by the management system that is accessible by a uniform resource locator (URL). The URL may be requested by non-conforming device 320 in order to automatically load the configurations from management system 350 in the form that is suitable for the non-conforming device.

While embodiments shown and described with FIG. 3 and FIG. 4 provide for DHCP server 315 to detect the network broadcast and trigger the proxy agent 340 into action, other embodiments may provide for another component on the conforming device 310 to perform the same function. For example, the TFTP server 318 may be configured to trigger proxy agent 340 to retrieve the set of configurations from management system 350 in response to a TFTP network request or response. For example, conforming device 310 may receive a "GET" command from the non-conforming device 320, which is intended for TFTP server 318. At that point, proxy agent 340 may cause the delay of a response from the TFTP server 318, then retrieve the configurations from the management system 350 for the non-conforming device 320.

A system such as described with FIG. 3 and FIG. 4 may be made more flexible and robust by providing several components that can each retrieve configurations for the non-conforming device 320. For example, in FIG. 3, both DHCP server 315 and TFTP server 318 may retrieve the configurations from management system 350. The conforming device 310 responds to the type of communication sent by non-conforming device 320. The particular server component and function performed is based on the type of communication received form the non-conforming device 320. For example, if the "GET" command is received instead of the DHCP broadcast, then conforming device 310 uses the TFTP server 318 to retrieve the configurations for non-conforming device 320.

In an embodiment, a finite state machine may be implemented on conforming device 310 to extend the ability of the conforming device to provide configurations for non-conforming devices that use different platforms. The particular state of the state machine may be determined by the communication sent from non-conforming device 320. The particular action taken to configure the non-conforming device 320 may be determined by the particular state of the finite state machine.

5.0 Implementation Mechanisms—Hardware Overview

Figure 5:
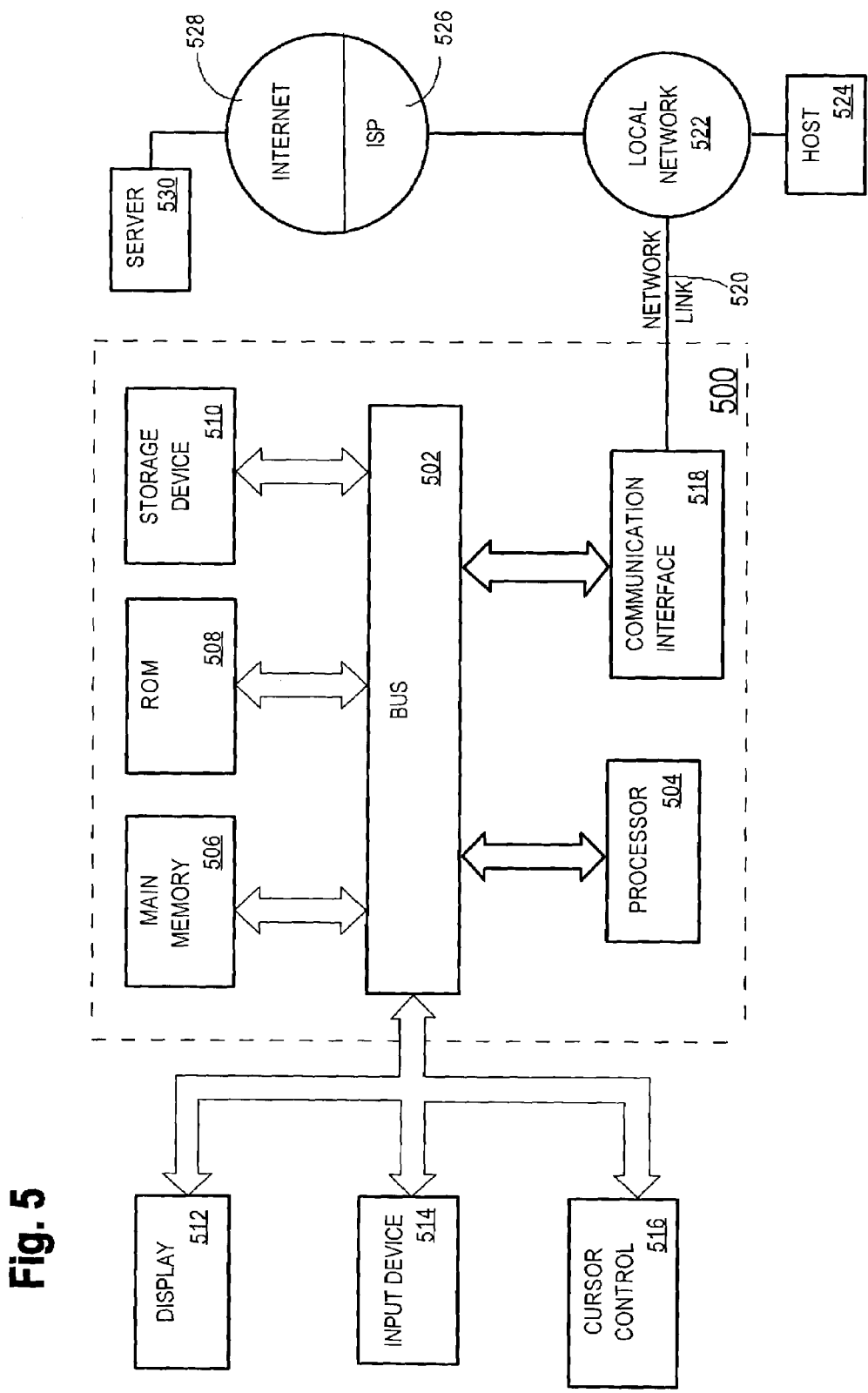
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for configuring a device that is non-conforming with a management system using configurations provided by the management system over a network. According to one embodiment of the invention, a technique for configuring a device that is non-conforming with a management system using configurations provided by the management system over a network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for configuring a device that is non-conforming with a management system using configurations provided by the management system over a network as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of configuring a network device that is non-conforming with a management system using configurations provided by the management system over a network, the method comprising the computer-implemented steps of:

detecting, by a first network device managed by the management system, a network event associated with a second network device that is non-conforming with the management system;

wherein the management system comprises a management server, which comprises at least one of:

a network services server;

a network services event gateway; or a network services configuration server;

wherein the non-conforming second network device cannot receive normal configurations from the management system;

in response to the network event, the first network device retrieving a set of configurations from the management system, wherein retrieving the set of configurations includes identifying the second network device;

the first network device converting the set of configurations into a converted form usable by the second network device;

wherein the step of converting the set of configurations into a form suitable for the non-conforming device includes retrieving logic from the management system to convert the set of configurations into the form suitable for the non-conforming device in response to a network broadcast;

providing the set of configurations in the converted form to the second network device; and configuring the second network device according to the set of configurations in the converted form wherein the management system manages the second network device based on the configuring step.

2. A method of using a management system to configure a network device that is non-conforming with the management system for communications on a network, the method comprising the computer-implemented steps of:

detecting, with a first network device managed with the management system, a Dynamic Host Configuration Protocol network broadcast from a second network device that is non-conforming with the management system;

wherein the management system comprises a management server, which comprises at least one of:

a network services server;

a network services event gateway; or a network services configuration server;

wherein the non-conforming second network device cannot receive normal configurations from the management system;

delaying a response to the network broadcast from a Dynamic Host Configuration Protocol server;

the first network device retrieving a set of configurations from the management system, wherein retrieving the set of configurations includes identifying the second network device;

the first network device retrieving logic from the management system;

converting the set of configurations into a form suitable for the non-conforming device according to the logic from the management system;

wherein the converting step includes retrieving logic from the management system to convert the set of configurations into the form suitable for the non-conforming device in response to the network broadcast; and configuring the second network device to communicate over the network according to the set of configurations in the converted form wherein the management system manages the second network device based on the configuring step.

3. A method as recited in claim 2, further comprising the step of:
the first network device converting the set of configurations into a form suitable for the second network device.

4. A method as recited in claim 2, wherein using the response to enable the non-conforming device includes associating the set of configurations with a Trivial File Transfer Protocol server that is identified in a Dynamic Host Configuration Protocol response.

5. A method as recited in claim 2, wherein retrieving the set of configurations includes retrieving data selected from the set of data consisting of a phone number for the second network device, a host name for sending communications over the network, security parameters, a network address for the second network device, and a network address of a pertinent service for the second network device.

6. A method as recited in claim 2, further comprising the step of:
with the first network device converting the set of configurations into a form suitable for the second network device; and
wherein converting the set of configurations into a form suitable for the second network device includes converting the set of configurations from a markup language form into the form suitable for the second network device.

7. A method as recited in claim 2, further comprising the step of:
the first network device converting the set of configurations into a form suitable for the second network device; and
wherein converting the set of configurations into a form suitable for the device includes converting the set of configurations from an extendible markup language form into the form suitable for the second network device.

8. A method as recited in claim 2, further comprising the step of:
the first network device converting the set of configurations into a form suitable for the second network device; and
wherein converting the set of configurations into a form suitable for the second network device includes converting the set of configurations from an extendible markup language form into a binary form or into an ASCII form.

9. A method as recited in claim 2, further comprising the step of triggering the step of delaying a response to the Dynamic Host Configuration Protocol broadcast in response to detecting that the DHCP broadcast is from a source that is unknown to a Dynamic Host Configuration Protocol server that is to respond to the broadcast.

10. A method as recited in claim 2, wherein using the response to enable the second network device includes providing the set of configurations so that the second network device can be configured to be managed and controlled by the management system.

11. A method as recited in claim 2, wherein using the response to enable the second network device includes:
sending the response to the Dynamic Host Configuration Protocol broadcast from the Dynamic Host Configuration Protocol server, wherein the response includes identification of a Trivial File Transfer Protocol server.

12. A method as recited in claim 2, wherein using the response to enable the second network device includes:
sending the response to the Dynamic Host Configuration Protocol broadcast from the Dynamic Host Configuration Protocol server, wherein the response includes identification of a Trivial File Transfer Protocol server; and
storing the set of configurations in a file associated with the Trivial File Transfer Protocol server for subsequent use by the second network device.

13. A computer-readable storage medium carrying one or more sequences of instructions for configuring a network device that is non-conforming with a management system using configurations provided by the management system over a network, which instructions, when executed by one or more processors, cause the one or more processors to carry out the steps of:
detecting, by a first network device managed by the management system, a network event associated with a second network device that is non-conforming with the management system;
wherein the management system comprises a management server, which comprises at least one of:
a network services server;
a network services event gateway; or
a network services configuration server;
wherein the non-conforming network device cannot receive normal configurations from the management system;
in response to the network event, the first network device retrieving a set of configurations from the management system, wherein retrieving the set of configurations includes identifying the second network device;
the first network device converting the set of configurations into a converted form usable by the second network device;
wherein the converting step includes retrieving logic from the management system to convert the set of configurations into the form suitable for the non-conforming device in response to a network broadcast;
providing the set of configurations in the converted form to the second network device; and
configuring the second network device according to the set of configurations in the converted form wherein the management system manages the second network device based on the configuring step.

14. An apparatus for configuring a network device that is non-conforming with a management system using configurations provided by the management system over a network, comprising:
- means for detecting, by a first network device managed by the management system, a network event associated with a second network device that is non-conforming with the management system;
- wherein the management system comprises a management server, which comprises at least one of:
  - a network services server;
  - a network services event gateway; or
  - a network services configuration server;
- wherein the non-conforming network device cannot receive normal configurations from the management system;
- means for retrieving, by the first network device, a set of configurations from the management system in response to detecting the network event, wherein retrieving the set of configurations includes identifying the second network device;
- means for converting, by the first network device, the set of configurations into a converted form usable by the device;
- wherein the converting means includes means for retrieving logic from the management system to convert the set of configurations into the form suitable for the non-conforming device in response to a network broadcast;
- means for providing the set of configurations in the converted form to the second network device; and
- configuring the second network device according to the set of configurations in the converted form wherein the management system manages the second network device based on the configuring step.

15. An apparatus for configuring a network device that is non-conforming with a management system using configurations provided by the management system over a network, comprising:
- one or more network ports coupled to the network to communicate with the management system and with the device;
- a processor;
  - wherein the processor is configured to access one or more stored sequences of instructions which, when executed by the processor, cause the processor to carry out the steps of:
    - detecting, by a first network device managed by the management system, a network event associated with a second network device that is non-conforming with the management system;
    - wherein the management system comprises a management server, which comprises at least one of:
      - a network services server;
      - a network services event gateway; or
      - a network services configuration server;
    - wherein the non-conforming network device cannot receive normal configurations from the management system;
    - in response to the network event, the first network device retrieving a set of configurations from the management system, wherein retrieving the set of configurations includes identifying the second network device;
    - the first network device converting the set of configurations into a converted form usable by the second network device;
    - wherein the instructions that cause the converting include instructions that cause retrieving logic from the management system to convert the set of configurations into the form suitable for the non-conforming device in response to a network broadcast;
    - providing the set of configurations in the converted form to the second network device; and
    - configuring the second network device according to the set of configurations in the converted form wherein the management system manages the second network device based on the configuring step.

16. An apparatus as recited in claim 14, further comprising:
- means for retrieving logic from the management system to convert the set of configurations into the converted form in response to the network event.

17. An apparatus as recited in claim 14, wherein means for detecting a network event includes means for detecting the network event as part of an initialization process performed by the second network device.

18. An apparatus as recited in claim 14, wherein means for providing the configurations in the converted form to the second network device includes means for using a response from a server designated to respond to the network event to enable the second network device to locate the set of configurations.

19. An apparatus as recited in claim 18, wherein means for providing the configurations in the converted form to the second network device includes means for delaying the response from the server until the set of configurations is retrieved.

20. An apparatus as recited in claim 14, wherein means for detecting a network event from the second network device includes means for detecting a Dynamic Host Configuration Protocol network broadcast from the second network device.

21. An apparatus as recited in claim 14, wherein:
- means for detecting a network event from the second network device includes means for detecting a Dynamic Host Configuration Protocol network broadcast; and
- means for providing the configurations in the converted form to the second network device includes means for using a response from a Dynamic Host Configuration Protocol server to send the set of configurations in the converted form to the second network device.

22. An apparatus as recited in claim 14, further comprising:
- means for detecting a network event from the second network device includes means for detecting a Dynamic Host Configuration Protocol network broadcast;
- means for providing the configurations in the converted form to the second network device includes means for using a response from a Dynamic Host Configuration Protocol server to send the set of configurations in the converted form to the second network device; and
- means for delaying the response from the Dynamic Host Configuration Protocol Server until the set of configurations is retrieved from the management system.

23. An apparatus as recited in claim 14, wherein means for providing the configurations in the converted form to the second network device includes means for sending the set of configurations in the converted form to the second network device over the network through a proxy hosted by the first network device.

24. An apparatus as recited in claim 14, wherein means for retrieving the set of configurations includes means for retrieving data selected from the set of configurations consisting of a phone number for the second network device, a host name for sending communications over the network, security parameters, a network address for the second network device, an encryption key, and a network address of a pertinent service for the second network device.

25. An apparatus as recited in claim 14, wherein means for converting the set of configurations into a converted form usable by the second network device includes means for converting the set of configurations from a markup language form into the form suitable for the second network device.

26. An apparatus as recited in claim 14, wherein means for converting the set of configurations into a converted form usable by the second network device includes means for converting the set of configurations from an extensible markup language form into the form suitable for the second network device.

27. An apparatus as recited in claim 14, wherein means for converting the set of configurations into a converted form usable by the second network device includes means for converting the set of configurations from an extensible markup language form into a binary form or into an ASCII form.

28. An apparatus as recited in claim 14, wherein means for providing the configurations in the converted form to the second network device includes means for storing the set of configurations in the converted form on the network for subsequent use by the second network device.

29. An apparatus as recited in claim 14, wherein means for providing the configurations in the converted form to the second network device includes means for enabling the first network device to load the set of configurations on the second network device so that the second network device can be managed and controlled by the management system.

30. An apparatus as recited in claim 15, wherein the one or more stored sequences of instructions, when executed by the processor, cause the processor to carry out the step of:
retrieving logic from the management system to convert the set of configurations into the converted form in response to the network event.

31. An apparatus as recited in claim 15, wherein the instructions that cause detecting a network event include instructions that cause detecting the network event as part of an initialization process performed by the second network device.

32. An apparatus as recited in claim 15, wherein the instructions that cause providing the configurations in the converted form to the second network device include instructions that cause using a response from a server designated to respond to the network event to enable the second network device to locate the set of configurations.

33. An apparatus as recited in claim 32, wherein the instructions that cause providing the configurations in the converted form to the second network device include instructions that cause delaying the response from the server until the set of configurations is retrieved.

34. An apparatus as recited in claim 15, wherein the instructions that cause detecting a network event from the second network device include instructions that cause detecting a Dynamic Host Configuration Protocol network broadcast from the second network device.

35. An apparatus as recited in claim 15, wherein:
the instructions that cause detecting a network event from the second network device include instructions that cause detecting a Dynamic Host Configuration Protocol network broadcast; and
the instructions that cause providing the configurations in the converted form to the second network device include instructions that cause using a response from a Dynamic Host Configuration Protocol server to send the set of configurations in the converted form to the second network device.

36. An apparatus as recited in claim 15, wherein the one or more stored sequences of instructions, when executed by the processor, cause the processor to carry out the steps of:
detecting a network event from the second network device includes detecting a Dynamic Host Configuration Protocol network broadcast;
providing the configurations in the converted form to the second network device includes using a response from a Dynamic Host Configuration Protocol server to send the set of configurations in the converted form to the second network device; and
delaying the response from the Dynamic Host Configuration Protocol Server until the set of configurations is retrieved from the management system.

37. An apparatus as recited in claim 15, wherein the instructions that cause providing the configurations in the converted form to the second network device instructions that cause sending the set of configurations in the converted form to the second network device over the network through a proxy hosted by the first network device.

38. An apparatus as recited in claim 15, wherein the instructions that cause retrieving the set of configurations include instructions that cause retrieving data selected from the set of configurations consisting of a phone number for the second network device, a host name for sending communications over the network, security parameters, a network address for the second network device, an encryption key, and a network address of a pertinent service for the second network device.

39. An apparatus as recited in claim 15, wherein the instructions that cause converting the set of configurations into a converted form usable by the second network device include instructions that cause converting the set of configurations from a markup language form into the form suitable for the second network device.

40. An apparatus as recited in claim 15, wherein the instructions that cause converting the set of configurations into a converted form usable by the second network device include instructions that cause converting the set of configurations from an extensible markup language form into the form suitable for the second network device.

41. An apparatus as recited in claim 15, wherein the instructions that cause converting the set of configurations into a converted form usable by the second network device include instructions that cause converting the set of configurations from an extensible markup language form into a binary form or into an ASCII form.

42. An apparatus as recited in claim 15, wherein the instructions that cause providing the configurations in the converted form to the second network device include instructions that cause storing the set of configurations in the converted form on the network for subsequent use by the second network device.

43. An apparatus as recited in claim 15, wherein the instructions that cause providing the configurations in the converted form to the second network device include instructions that cause enabling the first network device to load the set of configurations on the second network device so that the second network device can be managed and controlled by the management system.

* * * * *